United States Patent
Amigo et al.

(10) Patent No.: US 9,524,593 B2
(45) Date of Patent: *Dec. 20, 2016

(54) SYSTEMS AND METHODS FOR VEHICLE DATA ACQUISITION USING TELEMATICS-ENABLED PORTABLE DEVICES

(71) Applicant: HARTFORD FIRE INSURANCE COMPANY, Hartford, CT (US)

(72) Inventors: Andrew J. Amigo, Essex, MA (US); Rohit S. Bodas, Saratoga, CA (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/731,156

(22) Filed: Jun. 4, 2015

(65) Prior Publication Data

US 2015/0269791 A1    Sep. 24, 2015

Related U.S. Application Data

(63) Continuation of application No. 14/143,496, filed on Dec. 30, 2013, now Pat. No. 9,070,168, and a continuation of application No. 12/641,025, filed on Dec. 17, 2009, now Pat. No. 8,635,091.

(51) Int. Cl.
G06Q 40/00 (2012.01)
G06Q 40/08 (2012.01)
G07C 5/00 (2006.01)

(52) U.S. Cl.
CPC .............. *G07C 5/008* (2013.01); *G06Q 40/08* (2013.01)

(58) Field of Classification Search
CPC ...................................... G06Q 40/08
USPC ......................................... 705/4, 35
See application file for complete search history.

(56) References Cited

U.S. PATENT DOCUMENTS

| | | | |
|---|---|---|---|
| 5,910,882 A | 6/1999 | Burrell | |
| 6,301,534 B1 | 10/2001 | McDermott, Jr. et al. | |
| 6,636,790 B1 | 10/2003 | Lightner et al. | |
| 6,732,031 B1 | 5/2004 | Lowrey et al. | |
| 7,711,468 B1 | 5/2010 | Levy | |
| 8,525,247 B2 * | 9/2013 | Park | H01L 27/2409 257/314 |
| 2003/0120395 A1 | 6/2003 | Kacel | |
| 2004/0142659 A1 | 7/2004 | Oesterling | |

(Continued)

OTHER PUBLICATIONS

Clancy, Sharon; "Information highway"; Commercial Moter; Apr. 30, 2009, 4 pages.

(Continued)

*Primary Examiner* — Edward Chang
(74) *Attorney, Agent, or Firm* — Howard IP Law Group, PC

(57) ABSTRACT

Systems and methods are disclosed herein for transmitting telematics data from a vehicle. The systems include a smartphone holder that provides a communications link between a smartphone and a vehicle computer, through the smartphone dataport and the vehicle onboard diagnostics (OBD) port. The smartphone holder is configured to keep the smartphone in a stable, known position and orientation with respect to the vehicle, such that data from an accelerometer in the smartphone can be calibrated. The smartphone accelerometer data and telematics data from vehicle telematics sensors is then transmitted via the smartphone or stored locally.

20 Claims, 11 Drawing Sheets

(56) References Cited

U.S. PATENT DOCUMENTS

| | | |
|---|---|---|
| 2007/0247300 A1 | 10/2007 | Schindler |
| 2007/0299700 A1 | 12/2007 | Gay et al. |
| 2009/0079555 A1 | 3/2009 | Aguirre De Carcer et al. |
| 2009/0299900 A1 | 12/2009 | Chen |
| 2012/0008400 A1* | 1/2012 | Fukuzumi .......... G11C 16/0483 365/185.18 |
| 2014/0151777 A1* | 6/2014 | Sim ................... H01L 29/42324 257/315 |

OTHER PUBLICATIONS

Saunders, Michael; "Hack your car";The Boston Globe; Jun. 6, 2005, 4 pages.
Finkle, Jim, Experts Hope to Protect Cars From Computer Viruses, Daily Press, Newport News, VA, Sep. 9, 2012, 3 pages.

\* cited by examiner

SYSTEMS AND METHODS FOR VEHICLE DATA ACQUISITION USING TELEMATICS-ENABLED PORTABLE DEVICES

CROSS REFERENCE TO RELATED APPLICATIONS

This application is a continuation application of co-pending U.S. patent application Ser. No. 14/143,496 entitled SYSTEMS AND METHODS FOR ADJUSTING INSURANCE PROCESSES USING DATA FROM TELEMATICS-ENABLED PORTABLE DEVICES, filed Dec. 30, 2013, which is in turn a continuation application of U.S. patent application Ser. No. 12/641,025 entitled SYSTEMS AND METHODS FOR LINKING VEHICLES TO TELEMATICS-ENABLED PORTABLE DEVICES, filed Dec. 17, 2009, now U.S. Pat. No. 8,635,091, issued Jan. 21, 2014, the entire contents of each of which is hereby incorporated herein by reference for all purposes.

BACKGROUND OF THE INVENTION

Recently, to make vehicular insurance evaluations and analyses, insurance companies have suggested taking into account vehicle telematics data. However, not all vehicles have the sensors necessary to measure or record useful telematics data. In other cases, communicating with the vehicle's sensors or the vehicle computer that monitors those sensors poses a challenge. For example, different types of vehicles have different vehicle computers, each of which requires a different vehicle communication protocol for communication. In these situations, it may be desirable to provide a supplemental telematics sensing system for a vehicle. However, these supplemental telematics sensing systems tend to be bulky, expensive, cumbersome, and difficult to use. Thus, alternative telematics sensing systems may be desirable.

Smartphones such as the IPHONE® device and the BLACKBERRY® device are becoming more and more common. These smartphones have processing and memory capabilities that are comparable to those of desktop computers of the late 1990s, and are miniature computers in their own right. In addition, the incorporation of telematics sensors such as accelerometers and GPS sensors into smartphones is becoming more prevalent. For example, the IPHONE® device includes a miniature accelerometer that is configured to provide acceleration data to any of a multitude of applications executing on the IPHONE® device processor. The powerful processing and memory capabilities of modern smartphones, along with their data transmission capabilities, telematics-sensing capabilities, and widespread adoption, make them suitable candidates for portable supplemental telematics sensing systems for vehicles.

SUMMARY OF THE INVENTION

The invention discloses systems and methods for transmitting telematics data from a vehicle. The systems may include a smartphone holder that provides a communications link between a smartphone and a vehicle computer, through a smartphone dataport and a vehicle onboard diagnostics (OBD) port. The smartphone holder may be configured to keep the smartphone in a stable, known position and orientation with respect to the vehicle, such that data from an accelerometer in the smartphone may be calibrated. The smartphone accelerometer data and telematics data from vehicle telematics sensors may then transmitted via the smartphone or stored locally.

In one aspect, the invention relates to a system for providing telematics information from a vehicle with a vehicle computer. The system includes a holder for a portable personal communications device, configured to maintain the personal communications device in a stable position and a stable orientation with respect to the vehicle. The holder also has an onboard diagnostics (OBD) port connector and a dataport connector communicatively coupled to the OBD port connector. The system also includes a portable personal communications device with a telematics sensor, a dataport, a processor, and a memory, storing computer executable instructions. The dataport is coupled to the dataport connector of the holder for communicating with the vehicle computer. The computer executable instructions, when executed by the processor, cause the processor to receive telematics data from the telematics sensor and/or the vehicle computer, determine an orientation of the telematics sensor with respect to the vehicle, and transmit data indicative of the telematics data and the orientation from the portable personal communications device to a remotely located computer.

In one embodiment, the system includes a vehicle fastener for fastening the holder and/or the OBD port connector to the vehicle and/or the onboard diagnostics port associated with the vehicle computer. Optionally, the system includes a device fastener for fastening the holder to the portable personal communications device. In some of these embodiments, the device fastener automatically prevents the removal of the portable personal communications device from the holder upon detection of an engine start. In certain embodiments, the telematics sensor includes an accelerometer configured to detect acceleration in three dimensions. The system may include a power converter for receiving power from the vehicle computer and supplying power to the portable personal communications device.

In some embodiments, the computer executable instructions, when executed by the processor, cause the processor to transmit data to the vehicle computer. The data transmitted to the vehicle computer includes navigation information, vehicle control information, and/or vehicle multimedia instructions. Optionally, the data transmitted to the vehicle computer includes vehicle control instructions to prevent engine start and/or limit vehicle speed.

In certain embodiments, the computer executable instructions, when executed by the processor, cause the processor to identify a characteristic of the vehicle and retrieve a vehicle computer communication protocol based on the identified characteristic. In these embodiments, the computer executable instructions may cause the processor to identify the vehicle characteristic by presenting a user interface and receiving information about the vehicle via the user interface, and/or automatically obtaining information about the vehicle from the vehicle computer via an onboard diagnostics port associated with the vehicle. Optionally, the computer executable instructions may cause the processor to retrieve the vehicle computer communication protocol by retrieving the protocol from a database stored in a local memory, and/or by retrieving the protocol from an external source. In some embodiments, the computer executable instructions cause the processor to determine the orientation of the telematics sensor by determining the orientation based on the identified vehicle characteristic. In these embodiments, the computer executable instructions may cause the processor to determine the orientation by retrieving the orientation from a database stored in a local memory and/or by retrieving the orientation from an external source.

According to another aspect, the invention relates to a method for providing insurance to a vehicle. The method includes providing a system for transmitting telematics information from at least one vehicle with a vehicle computer, receiving, with a second processor, data based at least in part on telematics information indicative of the operation of the vehicle(s), and adjusting, with the second processor, an underwriting process, a premium determination process, and/or a workflow process, based on the received data. The system includes a holder for a portable personal communications device, configured to maintain the personal communications device in a stable position and a stable orientation with respect to the vehicle(s). The holder also has an onboard diagnostics (OBD) port connector and a dataport connector communicatively coupled to the OBD port connector. The system also includes a portable personal communications device with a telematics sensor, a dataport, a processor, and a memory. The dataport is coupled to the dataport connector of the holder for communicating with the vehicle computer.

In some embodiments, the premium determination process includes the determination of an initial insurance quote and/or an insurance renewal quote. In certain embodiments, receiving data with the second processor includes receiving aggregate telematics information indicative of the operation of a plurality of vehicles, and/or receiving telematics information from the vehicle(s), a computer associated with an owner of the vehicle(s), and/or a third party computer associated with the vehicle(s). Optionally, the telematics information indicative of the operation of the vehicle(s) includes telematics information from the portable personal communications device and from the vehicle computer.

In certain embodiments, vehicle computer interface information may be electronically transmitted to the portable personal communications device. Optionally, usage restrictions may be electronically transmitted to the portable personal communications device, and the personal communications device and the vehicle computer may be used to enforce the transmitted restrictions.

According to yet another aspect, the invention relates to an apparatus for providing telematics information from a vehicle. The apparatus includes an onboard diagnostics port (OBD) connector, an electronic output in communication with a portable personal communications device, and a rigid body, configured to maintain telematics sensor(s) in a stable position and a stable orientation with respect to the vehicle. The apparatus also includes circuitry configured to receive telematics information from a vehicle computer via the OBD connector and to output the received telematics information via the electronic output to the portable personal communications device.

In some embodiments, the telematic sensor(s) are incorporated into the rigid body, and the circuitry is further configured to transmit the output of the at least one telematics sensor to the portable personal communications device via the electronic output. Optionally, the electronic output is a dataport for accepting a communication cable or a wireless RF transmitter. In certain embodiments, the rigid body includes a holder for securely holding the portable personal communications device in a stable position and stable orientation, and the telematics sensor(s) are incorporated into the portable personal communications device. In one embodiment, the circuitry is configured to select a vehicle computer communications protocol from a plurality of vehicle computer communications protocols for communicating with the vehicle computer In yet another aspect, the invention relates to a kit for providing telematics information from a vehicle with a vehicle computer. The kit includes a telematics adapter apparatus and a computer readable medium storing computer executable instructions, which, when executed on a processor, cause the processor to carry out a method of providing telematics information for a vehicle having a vehicle computer. The telematics adapter apparatus includes an onboard diagnostics (OBD) port connector, a dataport connector linked to the OBD port connector, and a holder for a portable personal communications device. The dataport connector is configured to connect to the dataport of the portable personal communications device, and the holder is configured to maintain the portable personal communications device in a stable position and a stable orientation with respect to the vehicle. The method includes receiving telematics information from the telematics sensor and/or the vehicle computer. The method further includes determining the first orientation and transmitting the telematics information with a portable personal communications device.

BRIEF DESCRIPTION OF THE FIGURES

The methods and systems may be better understood from the following illustrative description with reference to the following drawings in which.

DETAILED DESCRIPTION

To provide an overall understanding of the invention, certain illustrative embodiments will now be described, including systems and methods for providing telematics information from a vehicle. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
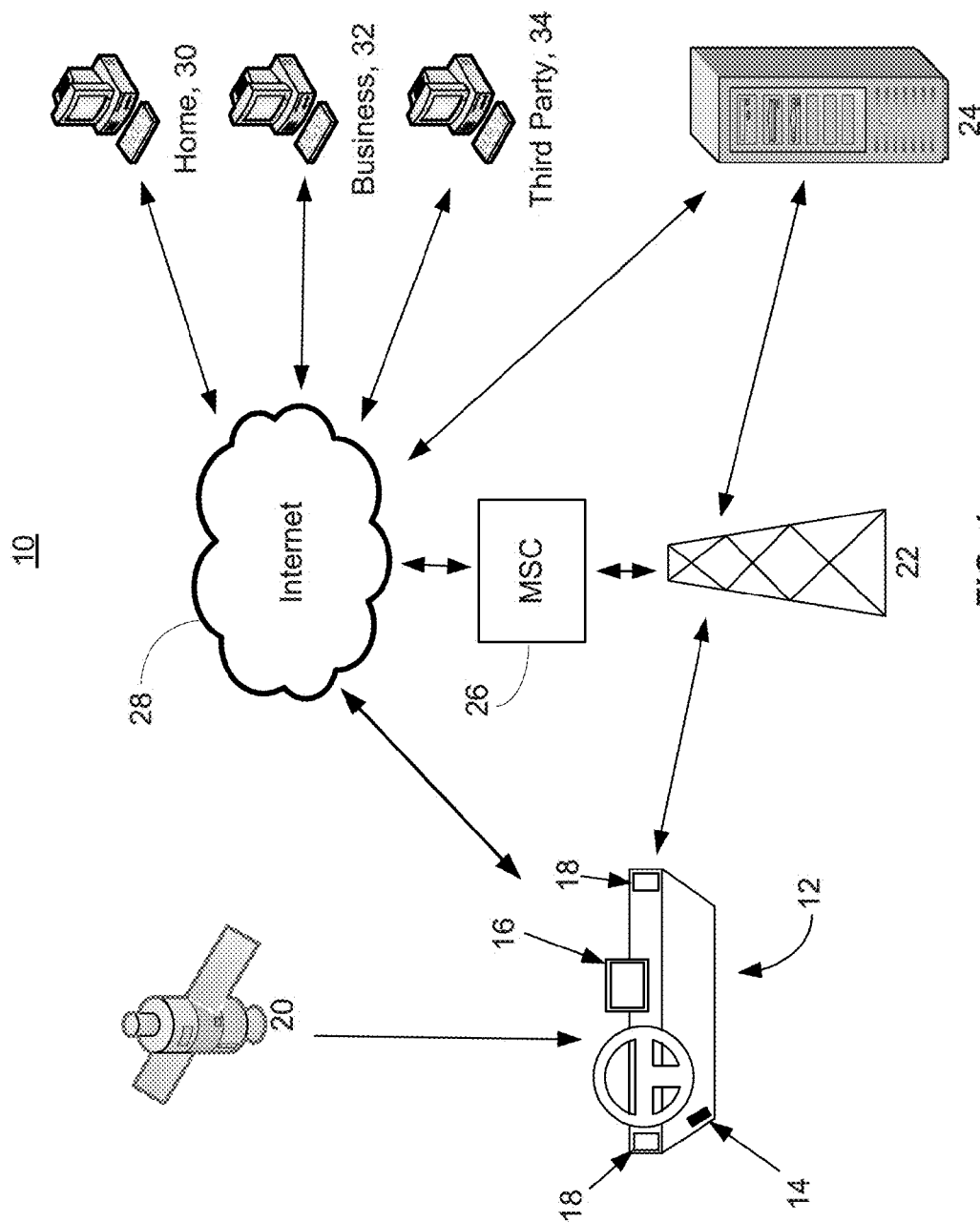
FIG. 1 is a diagram of a system for providing information from a vehicle to an insurance provider, according to an illustrative embodiment of the invention.

FIG. 1 is a diagram of a system 10 for providing information from a vehicle to an insurance provider, according to an illustrative embodiment of the invention. The system 10 includes a vehicle, represented by vehicle dashboard 12. The vehicle dashboard 12 includes a telematics device 14 coupled to the vehicle computer (not shown) through an onboard diagnostics (OBD) port of the vehicle. The vehicle dashboard 12 also includes a display device 16 (e.g., an on-board navigation system display) and audio devices 18 (e.g., stereo speakers). The telematics device 14 may be linked to the display device 16 and the audio devices 18 via its connection with the vehicle computer, and may be able to display or play back information to a vehicle operator via the display device 16 or the audio devices 18. The telematics device 14 may be able to receive information via a satellite connection 20, such as Global Positioning System (GPS) information. The telematics device 14 also includes a transmitter, which allows information transmission via a ground-based wireless network 22, such as a cellular phone network, broadband wireless system, WIMAX, or any other suitable wireless network. The wireless network 22 may then transmit directly to a receiver, e.g. computer server 24, or may transmit information over the Internet 28 through mobile switching center (MSC) 26. In some embodiments, the telematics device 14 may also directly transmit information over the Internet 28.

The telematics device 14 may transmit information such as telematics information to, for example, the computer server 24, associated with an insurance provider. The telematics device 14 may also transmit telematics information to a vehicle owner's home computer system 30, the computer system 32 of a business that owns the vehicle as part of a fleet of vehicles, or to the computer system 34 of a third party monitoring agency that may be engaged by the vehicle owner to monitor the vehicle. Computer systems 30, 32, and 34 may then transmit raw telematics information, processed telematics information, or data based on the telematics information to the insurance provider computer server 24.

Figure 2A:
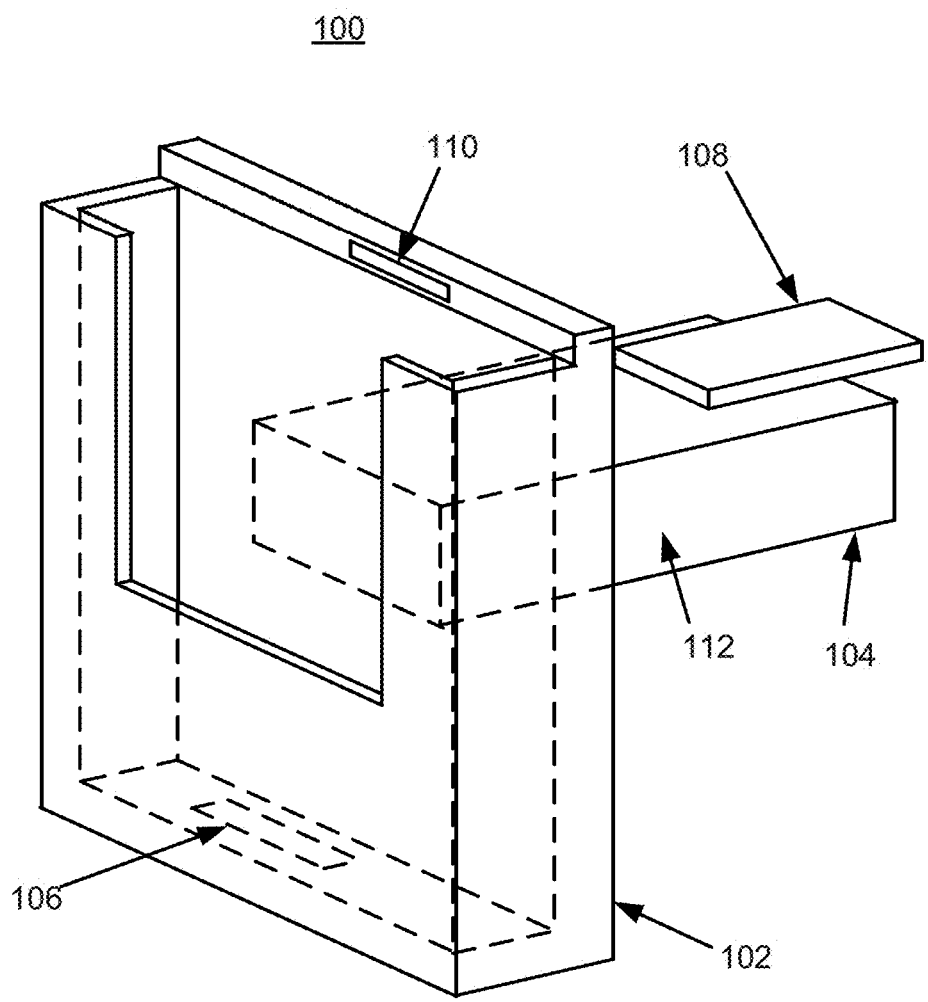
FIG. 2A depicts a front perspective view of a cradle for a portable personal communications device, according to an illustrative embodiment of the invention.
Figure 2B:
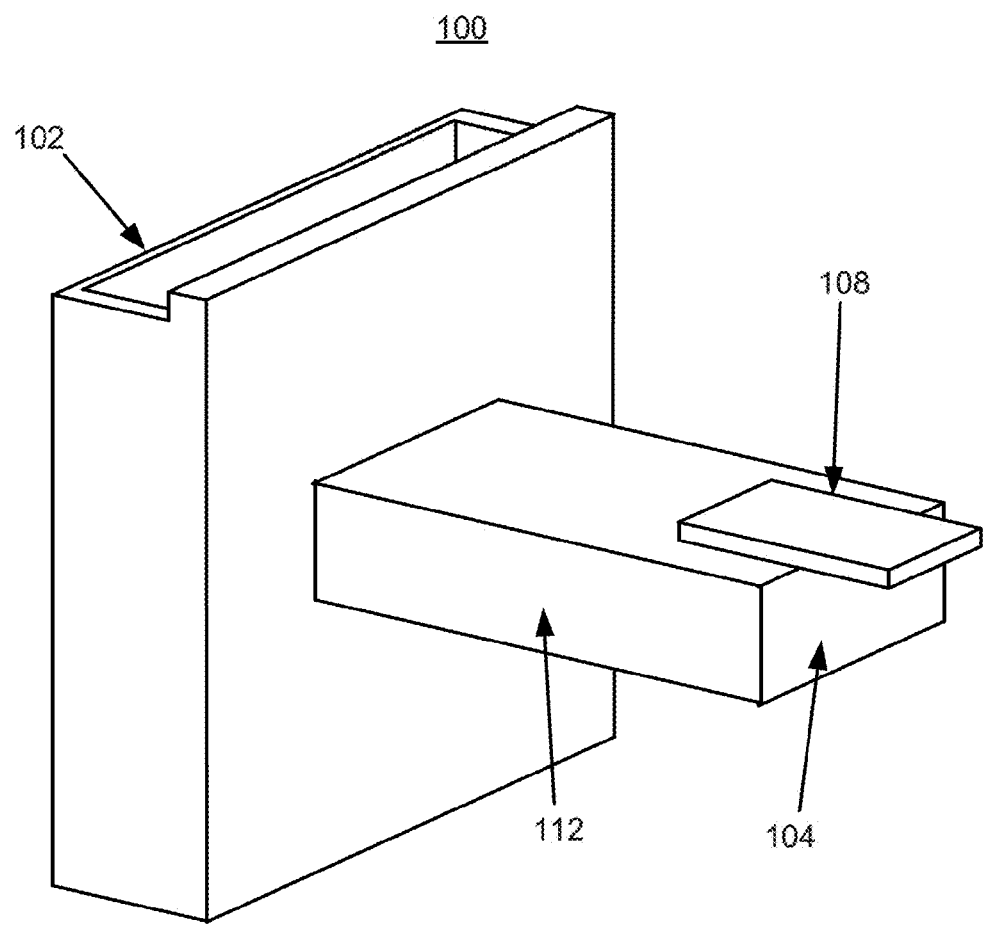
FIG. 2B depicts a back perspective view of the cradle of FIG. 2A, according to an illustrative embodiment of the invention.

FIGS. 2A-B depict front and rear perspective views of a cradle 100 for a portable personal communications device, according to an illustrative embodiment of the invention. Cradle 100 includes a holder 102 configured to receive and hold a portable personal communications device. The holder 102 is sized and shaped according to the particular portable device it is designed to hold. Optionally, the holder 102 may have a single size and/or shape selected to hold the most popular and/or widespread types of portable personal communications device. Alternatively, the holder 102 may be adjustable to fit a number of personal communications devices of different sizes or shapes. For example, the holder 102 may have elastic portions that can stretch or rigid portions that can be reconfigured to allow it to fit devices of different sizes or shapes. The cradle 100 includes an onboard diagnostics (OBD) port connector 104 mounted on an arm 112, for connecting to an OBD port on a vehicle. The cradle 100 also includes a dataport connector 106, communicatively coupled to the OBD port connector 104, for example via a wired connection (not shown) disposed within arm 112. The dataport connector 106 is configured to match the dataport on the portable personal communications device that the holder 102 is configured to hold. For example, if the portable personal communications device has a mini-USB port, the dataport connector 106 will be a mini-USB port connector. As another example, if the portable personal communications device is an IPHONE® device, manufactured by Apple, Inc. located in Cupertino, Calif., the dataport connector 106 will be an IPOD®/IPHONE® 30-pin port connector. In one embodiment, the dataport connector 106 is disposed on the holder 102 such that when a portable personal communications device is placed into the holder, the dataport connector 106 connects to a dataport on the portable personal communications device. In other embodiments, the dataport connector 106 may be configured to be manually connected to the dataport on the portable personal communications device after the device has been placed in the holder 102. For example, the dataport connector 106 may be mounted on a flexible support mounted on the holder 102.

In some embodiments, the cradle 100 includes an OBD port connector fastener 108 disposed on arm 112, for securing the OBD port connector 104 to the OBD port of a vehicle. For example, the OBD port connector fastener 108 may include one or more clips or resilient bands that fasten to the vehicle OBD port. For example, the OBD port connector fastener 108 may include one or more spring-hinged or flexible clips that are configured to snap over portions of the vehicle OBD port structure and secure the OBD port connector 104 to the vehicle OBD port. In other embodiments, the OBD port connector fastener 108 may be a vehicle fastener that fastens to a portion of the vehicle instead of or in addition to the vehicle OBD port. For example, the OBD port connector fastener 108 may include one or more adhesive pads to fasten the cradle 100 to one or more internal vehicle surfaces near the vehicle OBD port, thereby securing the OBD port connector 104 to the vehicle OBD port.

The cradle 100 includes a device fastener or restraint 110, to prevent removal of a portable personal communications device or smartphone placed within the holder 102. The device restraint 110 has at least two different configurations. In one configuration, the device restraint 110 does not interfere with the insertion or removal of the personal communications device into or out of the holder 102. In a second configuration, the device restraint 110 is configured to prevent the removal of the personal communications device from the holder 102, once the device has been inserted into the holder 102.

Since many vehicle OBD ports are located in recessed, out-of-the-way locations, the arm 112 is configured to maintain the holder 102 at a sufficient distance away from the OBD port such that components of the vehicle and/or the cradle 100 do not interfere with each other. In one embodiment, the arm 112 is also configured to maintain the holder 102 in a stable, known position and orientation with respect to the vehicle OBD port and/or the vehicle. For example, the arm 112 may be substantially rigid. In some embodiments, the arm 112 may be adjustable, enabling the holder 102 to be placed in one of a plurality of predetermined and known stable positions and/or orientations. For example, arm 112 may include a joint or pivot point (not shown) that the holder 102 may be able to rotate about.

Figure 3:
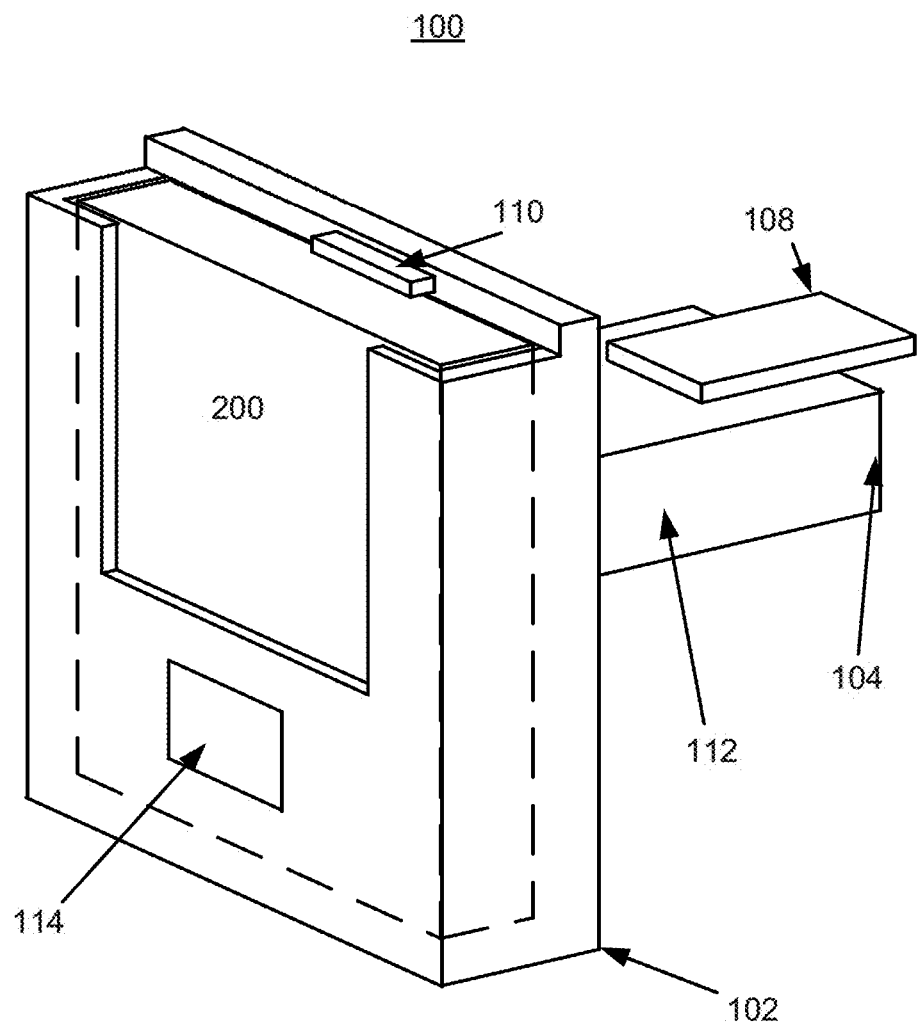
FIG. 3 depicts a front perspective view of the cradle of FIG. 2A with a smartphone, according to an illustrative embodiment of the invention.

FIG. 3 depicts a front perspective view of the cradle 100 with a smartphone 200, according to an illustrative embodiment of the invention. In the depicted embodiment, the device restraint 110 has been configured to prevent removal of the inserted smartphone. While the device restraint 110 is depicted as an extendable tab, any other suitable means for reversibly preventing the removal of an inserted smartphone may be used. The device restraint 110 may be electrically or mechanically actuated. In some embodiments, the vehicle computer, smartphone, or another processor in the system actuates the device restraint 110. Optionally, the user may also be able to manually actuate the device restraint 110. For example, if the system is unable to automatically actuate the device restraint 110 so that the smartphone can be removed, the user may be able to manually operate the device restraint 110.

The cradle 100 may include a biometric sensor 114 mounted on the holder 102. The biometric sensor 114 may be configured to detect biometric data from a user and transmit it to the smartphone 200 or the vehicle computer. In some embodiments, the biometric sensor 114 may be a fingerprint scanner configured to detect the fingerprint of a user.

The smartphone 200 may be an IPHONE® device, manufactured by Apple Inc., located in Cupertino, Calif., or any other suitable smartphone or portable personal communications device with one or more telematics sensors, such as accelerometers and/or Global Positioning System sensors.

The cradle 100 is configured to hold the smartphone 200 in a known, stable position and orientation. The holder 102 and device restraint 110 keeps the smartphone 200 from shifting, and the arm 112 maintains the holder 102 and the smartphone 200 in a stable position and orientation with respect to the vehicle/vehicle OBD port. The stable position and orientation of the smartphone 200 enables data from telematics sensors within the smartphone, such as accelerometers, to accurately reflect the behavior of the vehicle.

By maintaining the holder 102, and by extension, a smartphone placed in holder 102, in a stable, known position and orientation with respect to the vehicle, telematics information from telematics sensors within the smartphone can be calibrated with the known position/orientation information to provide telematics information that reflects vehicle behavior. For example, a smartphone with an accelerometer can provide acceleration information about the smartphone. If the smartphone is present in a vehicle, for example in the driver's pocket, then the smartphone acceleration information may somewhat reflect the acceleration behavior of the vehicle. However, because the smartphone is free to move and jostle about within the driver's pocket, the acceleration data from the smartphone cannot be correlated directly to vehicle acceleration behavior. If the smartphone is instead placed in a holder that is directly, physically connected to the vehicle and prevents the smartphone from moving with respect to the vehicle, then the acceleration information provided by the smartphone is more closely correlated to vehicle acceleration. Accelerometers are also useful because they can provide information that a vehicle computer may not be able to provide. For example, a vehicle computer may be equipped to detect when vehicle antilock brakes activate, indicative of heavy braking. However, user behavior or certain road conditions may not require the activation of vehicle antilock brakes, even when heavy braking occurs. Under these conditions, while the vehicle computer would not output a detection of antilock brake activation, thereby indicating a hard braking incident, accelerometers would detect the rapid deceleration due to the heavy braking, and thus allow the vehicle behavior to be captured more accurately.

The orientation of the smartphone, and by extension, its accelerometer, is also relevant for calibration of the acceleration data. For example, if the position of an accelerometer with respect to a vehicle is known but its orientation with respect to the vehicle is unknown, there is no way to distinguish if the acceleration is in a horizontal direction, e.g. the driver accelerating, braking, changing lanes, or turning, or in a vertical direction, e.g. the vehicle has just driven into a ditch, or over a hilly stretch of road. Similarly, while some smartphones can determine orientation using gravity-based calibration techniques, these gravity-based techniques do not necessarily precisely correspond to the actual orientation of the vehicle. For example, a smartphone in a vehicle using gravity-based calibration may detect that its orientation is level, even when the vehicle is parked on a slope.

Thus, a holder that not only holds the smartphone in a stable, known position, but also holds the smartphone in a stable, known orientation, allows smartphone acceleration information to be calibrated to closely correlate with vehicle acceleration. The cradle 100 and holder 102 is configured to hold a smartphone in a stable, known position and a stable, known orientation with respect to a vehicle OBD port, and by extension, the vehicle. Other vehicle phone holders may allow smartphones to be held in reasonably stable positions, but do not provide the certainty of position and orientation that the OBD-connected cradle 100 provides.

In one embodiment, the system for providing telematics information from a vehicle includes the smartphone cradle as described above. The system also includes software operative to process telematics data received from telematics sensors in the smartphone, telematics sensors in the vehicle, or from the vehicle computer. In one embodiment, the smartphone cradle is packaged with the software as a kit for a system for providing telematics information from a vehicle. In this embodiment, the software may be provided on a computer-readable medium. In other embodiments, the kit may include a network address, along with an optional identification or authentication code. The user may then connect to the network address to download the software, either directly onto a smartphone or onto a computer which then transfers the software onto the smartphone. In embodiments including identification or authentication codes, the user may need to provide the code before being able to download the software.

The term "computer-readable medium" as used herein refers to any medium that provides or participates in providing instructions to the processor of the computing device (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other medium from which a computer can read.

Various forms of computer readable media may be involved in carrying one or more sequences of one or more instructions to the processor 206 (or any other processor of a device described herein) for execution. For example, the instructions may initially be borne on a magnetic disk of a remote computer. The remote computer can load the instructions into its dynamic memory and send the instructions over an Ethernet connection, cable line, a telephone line using a modem, or even wirelessly. A communications device local to a computing device (or, e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Figure 4:
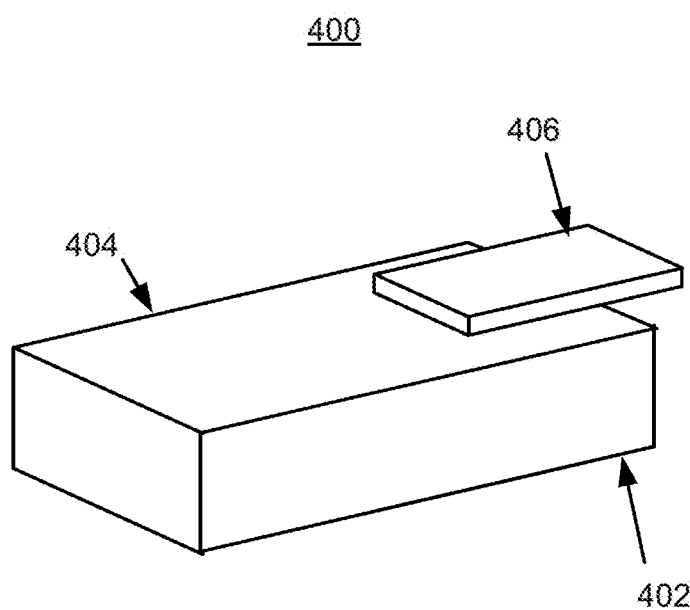
FIG. 4 depicts a perspective view of a wireless telematics device, according to an illustrative embodiment of the invention.

FIG. 4 depicts a wireless telematics system 400, according to an illustrative embodiment of the invention. The wireless telematics system 400 includes an OBD port connector 402, an OBD connector port fastener 406, and a wireless telematics device 404. The OBD port connector 402 and the OBD connector port fastener 406 may be similar to the OBD port connector 104 and OBD connector port fastener 108 described in relation to FIGS. 2-3, described above. The wireless telematics device 404 includes one or more telematics sensors, such as an accelerometer configured to measure acceleration in three dimensions. The wireless telematics device 404 also includes a local storage device to store measured telematics information and/or a wireless transmitter that is configured to transmit measured telematics information to an external device. In some embodiments, the wireless transmitter uses a wireless protocol such as a Bluetooth or WIFI protocol to communicate with the external device, such as a smartphone. Optionally, the wireless telematics device 404 may include a biometrics sensor (not shown) configured to detect biometric information from a user. For example, a user may use the biometric sensor to authenticate him or herself to the wireless telematics system 400.

The wireless telematics device 404 further includes processing circuitry configured to receive data from telematics sensors in the telematics device 404 or in the vehicle, via the OBD port connector 402, and also to transmit telematics data via an included wireless transmitter. The processing circuitry may be configured to transmit the unprocessed telematics data received directly from the telematics sensors, or may be configured to process the telematics data before transmission. For example, the wireless telematics device 404 may convert unprocessed data received from an internal accelerometer to acceleration data based on orientation and position information that may be stored in the local storage device.

The wireless telematics system 400 may include a power supply (not shown), such as a battery pack, for powering the wireless telematics device 404. In some embodiments, the wireless telematics system 400 may receive power from a vehicle computer, through the OBD port connector 402, and may also charge any included power supplies with the received power.

Figure 5:
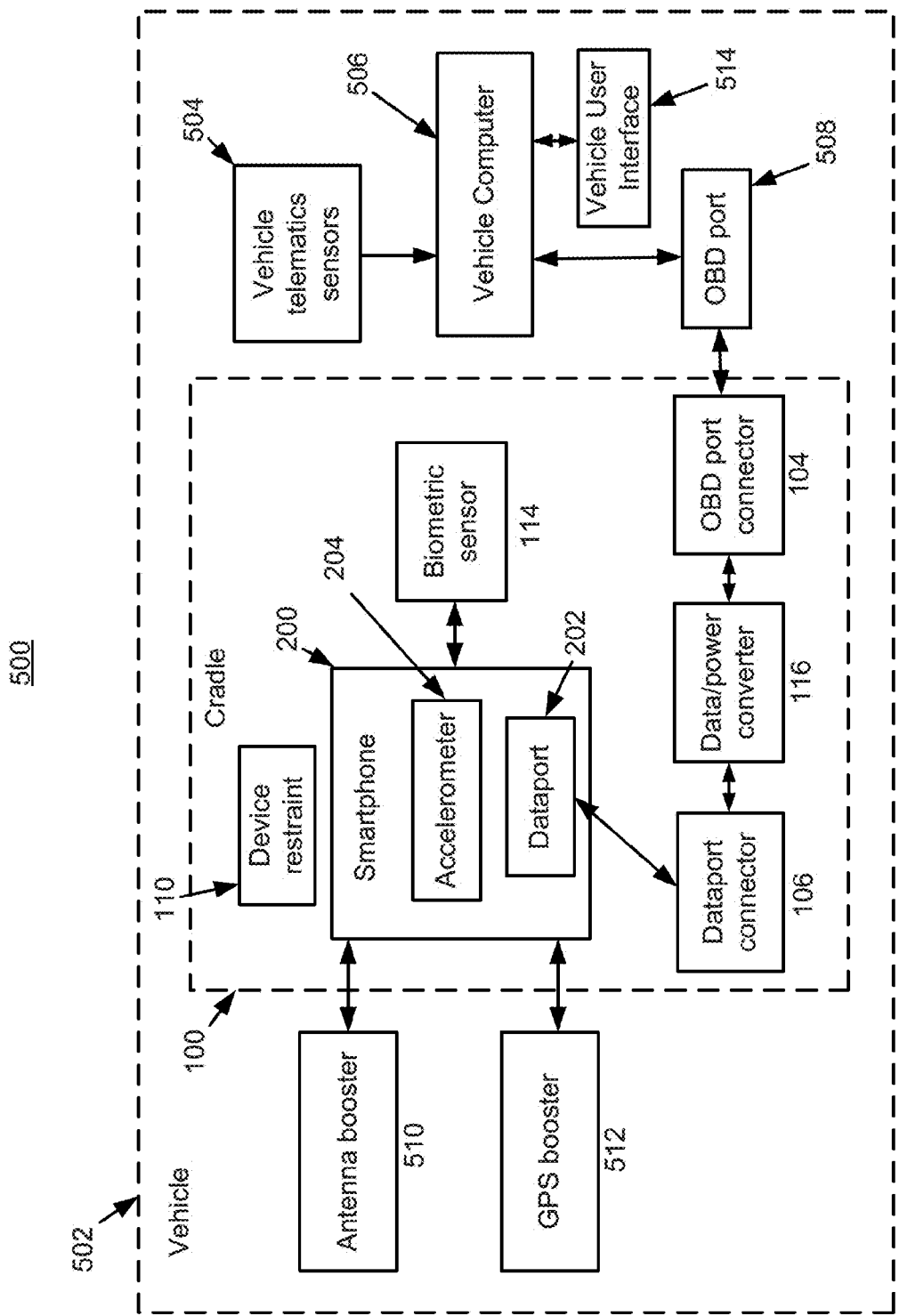
FIG. 5 is a block diagram of a system for providing telematics information from a vehicle, according to an illustrative embodiment of the invention.

FIG. 5 is a block diagram of a system 500 for providing telematics information from a vehicle, according to an illustrative embodiment of the invention. System 500 includes a vehicle 502, which has vehicle telematics sensors 504, a vehicle computer 506, and an OBD port 508. Vehicle 502 may be an automobile or any other land vehicle, such as a truck, a motorcycle, or a snowmobile. In other embodiments, vehicle 502 may be any watergoing or flying vehicle, such as a boat, a ship, a submarine, an aircraft, or a helicopter. Vehicle telematics sensors 504 include sensors that measure various vehicle telematics data. For example, with respect to automobiles or land vehicles, these vehicle telematics data may include, without limitation, speed, location, acceleration, deceleration, environmental conditions (e.g., presence of icy roads or precipitation), tire pressure, engine use time, and vehicle diagnostic information. The vehicle telematics sensors 504 transmit measured vehicle telematics data to the vehicle computer 506, which may store the telematics data in a local memory or storage (not shown). The OBD port 508 allows external devices, such as automotive diagnostics computers, to interface with the vehicle computer 506. External devices may be able to program the vehicle computer 506, or to retrieve vehicle telematics data.

The vehicle 502 may include one or more vehicle user interfaces 514. The vehicle user interfaces 514 may include, without limitation, audiovisual systems, display screens, and user input devices such as touchscreens, buttons, or any device suitable for user input.

The system 500 includes a cradle 100 and a smartphone 200, described with relation to FIGS. 2-3. The cradle 100 includes an OBD port connector 104 and a dataport connector 106. The OBD port connector 104 is coupled to the dataport connector 106 through a data/power converter 116. The converter 116, which may be located in the arm 112 (FIGS. 2-3), includes processing circuitry for converting data between the format received by the OBD port connector 104 and the dataport connector 106. For example, if the dataport connector 106 is a mini-USB port connector, the processing circuitry in converter 116 converts data received from the OBD port connector 104 from an OBD port format to a USB format. Similarly, the processing circuitry in converter 116 converts data received from the mini-USB port connector to an OBD port format. The converter 116 is also configured to provide power from the vehicle computer 506 through the OBD port 508 to the smartphone 200 via the dataport 202 and the dataport connector 106.

In some embodiments, the smartphone 200 transmits data to the vehicle computer 506 via the dataport/OBD connection. This data may include, without limitation, vehicle navigation information, vehicle control information, and/or vehicle multimedia information. For example, audio directions for a particular destination may be transmitted to the vehicle computer, which may then play the audio instructions via vehicle user interfaces 514. Similarly, the smartphone 200 may transmit instructions to the vehicle computer to limit the maximum speed or maximum acceleration. As yet another example, the smartphone 200 may be able to unlock vehicle doors by communicating with the vehicle computer 506. For example, if a vehicle operator has accidentally locked the vehicle doors, if the smartphone 200 and the cradle 100 remain linked to the vehicle computer 506, the operator may be able to send an electronic message to or call the smartphone 200 to have it instruct the vehicle computer 506 to unlock the vehicle doors. Similarly, the operator may be able to remotely start the vehicle by calling or sending a message to the smartphone 200.

In some embodiments, the smartphone 200 receives information from the vehicle computer 506 via the dataport/OBD connection. This information may include vehicle telematics data from vehicle telematics sensors 504 and/or other information related to the vehicle and its current condition. For example, the smartphone 200 may receive information about the number of passengers in the vehicle, which may be determined by audio processing (e.g., differentiating between the different voices heard in the vehicle) or other sensor information (e.g. weight sensors in the passenger seats).

The cradle 100 may include a biometric sensor 114, configured to detect biometric data from a user and transmit it to the smartphone 200. Optionally, the biometric sensor 114 may also be configured to transmit biometric data to the vehicle computer 506 via the OBD port connector. The cradle 100 also includes a device restraint 110, as described above, in relation to FIGS. 2-3.

The smartphone 200 includes a dataport 202 and an accelerometer 204. Depending on the type of smartphone, the dataport 202 may be a mini-USB port, an IPHONE®/IPOD® 30-pin port, a Firewire port, or any other suitable port. The smartphone 200 communicates with the vehicle computer 506, and optionally the biometric sensor 114, via the dataport 202. The accelerometer 204 is configured to provide measurements of acceleration in three dimensions. Optionally, the smartphone 200 may include other telematics sensors, such as a Global Positioning System (GPS) sensor.

Since the OBD port in vehicle 502 may be placed in an out-of-the-way location, the smartphone 200 may experience decreased transmission/reception signal strength when placed in the cradle 100. Therefore, the system 500 may include additional components configured to link to the smartphone 200 and to increase the transmission/reception signal strength. For example, the system 500 may include an antenna booster 510 that may be configured as an extended antenna or signal repeater for the smartphone 200 similar to the Vodafone 3G WCDMA2100/900 Omni Antenna, sold by Vodafone, located in Berkshire, UK. Optionally, for smartphones that include GPS sensors, the system 500 may include a GPS booster 512 configured to increase satellite signal reception, similar to the GPS booster used in the TomTom Car Kit for IPHONE®, sold by TomTom, located in Concord, Mass.

In other embodiments, in addition to or in place of biometric sensor 114, the cradle 100 may include other suitable sensors (not shown). For example, the cradle 100 may include one or more chemical sensors, such as an alcohol sensor (e.g., breathalyzer) or a carbon monoxide sensor. Optionally, the cradle 100 may include an auxiliary sensor port (not shown), to which one or more external sensors, such as a breathalyzer or a carbon monoxide sensor, may be connected. This allows the external sensors to be placed some distance away from the cradle 100, which mitigates the potential disadvantages that the out-of-the-way location of the vehicle OBD port (and the cradle 100) may create. For example, an external breathalyzer may be linked to the cradle auxiliary sensor port and placed within easy user access on the vehicle steering wheel, instead of having to be placed near the out-of-the-way vehicle OBD port.

In some embodiments, the cradle 100 may also include one or more telematics sensors, such as accelerometers, Global Positioning System (GPS) sensors, and/or gyroscopes. These sensors may be located, for example, on or in holder 102 and/or arm 112 (FIGS. 2-3). In these embodiments, the telematics sensors included within the cradle 100 may provide telematics information that supplements the telematics information provided by the smartphone 200 and/or the vehicle telematics sensors 504. In other embodiments, the cradle 100 may be configured to hold a smartphone that does not include telematics sensors. In these embodiments, the telematics sensors included within cradle 100 may measure telematics information associated with the vehicle 502 and store and/or transmit the measured telematics information via the smartphone. For example, the cradle 100 may include one or more accelerometers configured to measure acceleration of the vehicle in three dimensions and store or transmit the measured acceleration information via the smartphone. If the smartphone also includes accelerometers, then the cradle accelerometers may operate in conjunction with the smartphone accelerometers.

Figure 6:
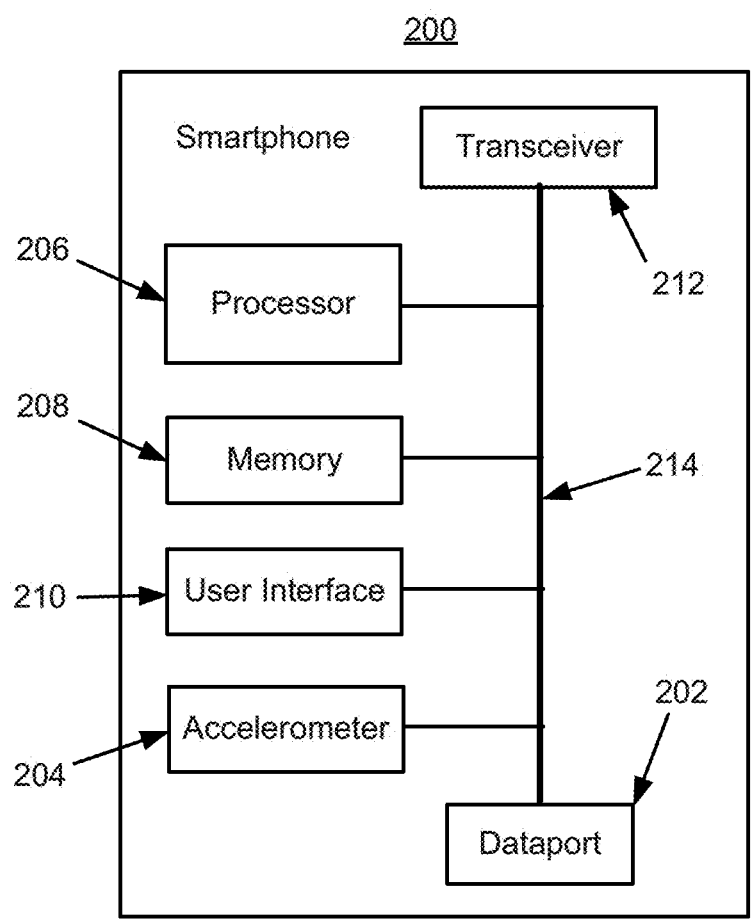
FIG. 6 is a block diagram of a smartphone with a telematics sensor, according to an illustrative embodiment of the invention.

FIG. 6 is a block diagram of a smartphone 200 with a telematics sensor, according to an illustrative embodiment of the invention. The smartphone 200 includes a processor 206, communicatively linked to a dataport 202, an accelerometer 204, a memory 208, a user interface 210, and a transceiver 212. These components are communicatively coupled together by interconnect bus 214. The processor 206 may include any processor used in smartphones and portable devices, such as an ARM processor, manufactured by Samsung, located in South Korea. In some embodiments, the processor 206 may include other processors such as one or more conventional microprocessors and one or more supplementary co-processors such as math co-processors.

The dataport 202 may be any type of connector used for physically interfacing with a smartphone, such as a mini-USB port or an IPHONE®/IPOD® 30-pin connector. In other embodiments, the dataport 202 may include multiple communication channels for simultaneous communication with, for example, other processors, servers or client terminals. Devices in communication with each other need not be continually transmitting to each other. On the contrary, such devices need only transmit to each other as necessary, may actually refrain from exchanging data most of the time, and may require several steps to be performed to establish a communication link between the devices.

The accelerometer 204 may be any miniature or MEMS-based accelerometer suitable for use in a smartphone, such as a LIS302DL MEMS motion sensor, manufactured by STMicroelectronics, located in Switzerland.

The memory 208 may include both operating memory, such as random access memory (RAM), as well as data storage such as read-only memory (ROM), hard drives, Flash memory, or any other suitable memory/storage element. The memory 208 may include removable memory elements, such as a CompactFlash card and/or a Secure Digital card. In some embodiments, the memory 208 may comprise an appropriate combination of magnetic, optical and/or semiconductor memory, and may include, for example, RAM, ROM, flash drive, an optical disc such as a compact disc and/or a hard disk or drive. The processor 206 and the memory 208 each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wired medium or combination of the foregoing. For example, the processor 206 may be connected to the memory 208 via the dataport 202.

The user interface 210 may include any user interface or presentation elements suitable for a smartphone, such as keypads, LCD display screens, touchscreens, microphones, and speakers. The transceiver 212 includes one or more transceiver modules capable of transmitting and receiving data, using protocols such as GSM, IS-95 (CDMA), GSM EDGE, UMTS, CDMA2000, WIFI, WIMAX, or any other suitable protocol.

Figure 7:
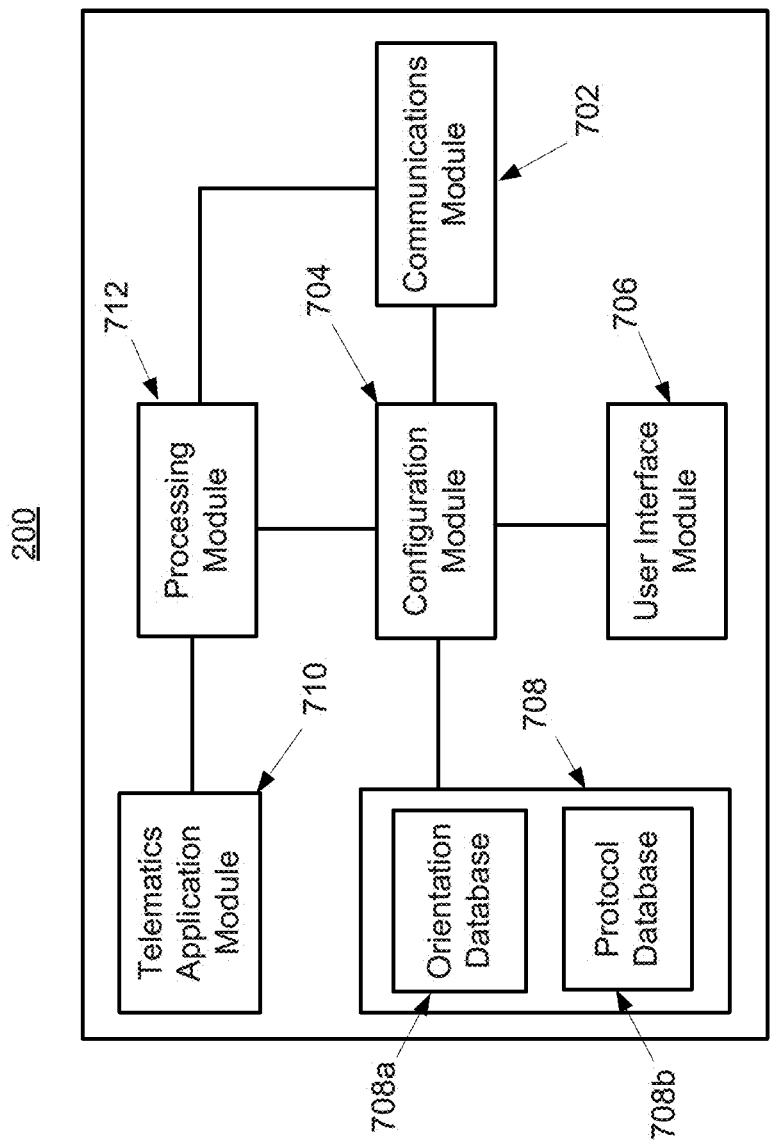
FIG. 7 is a conceptual block diagram for a smartphone with a telematics sensor, according to an illustrative embodiment of the invention.

Memory 208 stores software or vehicle computer communication protocols for processing telematics information and/or communicating with other systems, such as the vehicle computer 506. Vehicle computer communication protocols may include, for example, processor interface protocols (PIPs), application programming interfaces (APIs), or onboard diagnostics interface protocols, such as OBD-I, OBD-1.5, OBD-II, EOBD, EOBD2, JOBD, or any other similar protocol. The memory 208 may store, for example, (i) a program (e.g., computer program code and/or a computer program product) adapted to direct the processor 206 in accordance with the present invention, and particularly in accordance with the processes described in detail with regard to the CPU 206; and/or (ii) databases adapted to store information that may be utilized to store information required by the program. Suitable databases include orientation database 708a (FIG. 7) and vehicle computer communication protocol database 708b (FIG. 7).

The software also may include program elements such as an operating system, a database management system and "device drivers" that allow the processor to interface with computer peripheral devices (e.g., an external video display, a keyboard, a computer mouse, etc.). The software may be stored, for example, in a compressed, an uncompiled and/or an encrypted format, and may include computer program code. The instructions of the program may be read into a main memory of the processor from a computer-readable medium. While execution of sequences of instructions in the program causes the processor 206 to perform the process steps described herein, hard-wired circuitry may be used in place of, or in combination with, software instructions for implementation of the processes of the present invention. Thus, embodiments of the present invention are not limited to any specific combination of hardware and software.

In other embodiments, processor 206 may be configured in many different ways. For example, processor 206 may be a conventional standalone computer or alternatively, the function of processor 206 may be distributed across multiple processors and architectures.

Processor 206 may be configured in a distributed architecture, wherein databases and processors are housed in separate units or locations. Some such units perform primary processing functions. In such an embodiment, each of these units is attached to a communications hub or port that serves as a primary communication link with other servers, client or user computers and other related devices. The communications hub or port may have minimal processing capability itself, serving primarily as a communications router. A variety of communications protocols may be part of the system, including but not limited to: Ethernet, SAP, SAS™, ATP, BLUETOOTH™, GSM and TCP/IP.

FIG. 7 is a conceptual block diagram for a smartphone 200 with a telematics sensor in a system for providing telematics information from a vehicle, according to an illustrative embodiment of the invention. The smartphone 200 includes a communications module 702, a configuration module 704, a user interface module 706, a database 708, a telematics application module 710, and a processing module 712.

The communications module 702 is configured to handle communications links between the smartphone 200 and other, external devices or receivers and to route incoming/outgoing data appropriately. For example, data going to or coming from the smartphone dataport 202 (FIG. 6) is first routed through the communications module 702 before being directed to or from the configuration module 704 and/or the processing module 712. Similarly, data to or from the transceiver 212 (FIG. 6) is first routed through the communications module 702.

The configuration module 704 is configured to establish the initial calibration parameters for the telematics information system. The configuration module 704 is linked to the communications module 702, the user interface module 706, the database 708, and the processing module 712. During the initialization process, discussed further below in relation to FIG. 8, the configuration module 704 collects vehicle information from the communications module 702 and/or the user interface module 706. For example, the configuration module may identify the vehicle make and/or model via the communications module, which is linked to the vehicle computer through the smartphone dataport. The configuration module may also collect vehicle identification data from the user interface module 706. For example, the configuration module may instruct the user interface module to present a graphical user interface with user interface 210 (FIG. 6), by which a user can enter relevant vehicle information.

Based on the received vehicle information, the configuration module 704 determines the appropriate operating configuration, such as a suitable vehicle computer communication protocols for communicating with the vehicle computer and/or position/orientation data for calibrating the smartphone telematics sensor(s). The configuration module 704 may access this data from the database 708, which contains an orientation database 708a and a vehicle computer communication protocol database 708b. Database 708 is stored on memory 208 (FIG. 6). In some embodiments, the configuration module 704 may access this data on a remote source or device, via the communications module 702. Optionally, the configuration module 704 may also transmit data and/or software to the vehicle computer via communications module 702. The configuration and initialization process is described further in relation to FIG. 8, below.

The telematics application module 710 is configured to collect telematics information from smartphone telematics sensors, such as the smartphone accelerometer 204 (FIG. 6), as well as from the vehicle computer. The telematics application module 710 is linked to processing module 712, which processes raw telematics information received from the telematics application module 710 with calibration information provided by the configuration module 704 to determine actual vehicle acceleration data. This actual vehicle acceleration data is then transmitted to a remote server, such as a remote server associated with an insurance company, via the communications module 702 and the transceiver 212 (FIG. 6). In some embodiments, the determined vehicle acceleration data may be stored in database 708.

Figure 8:
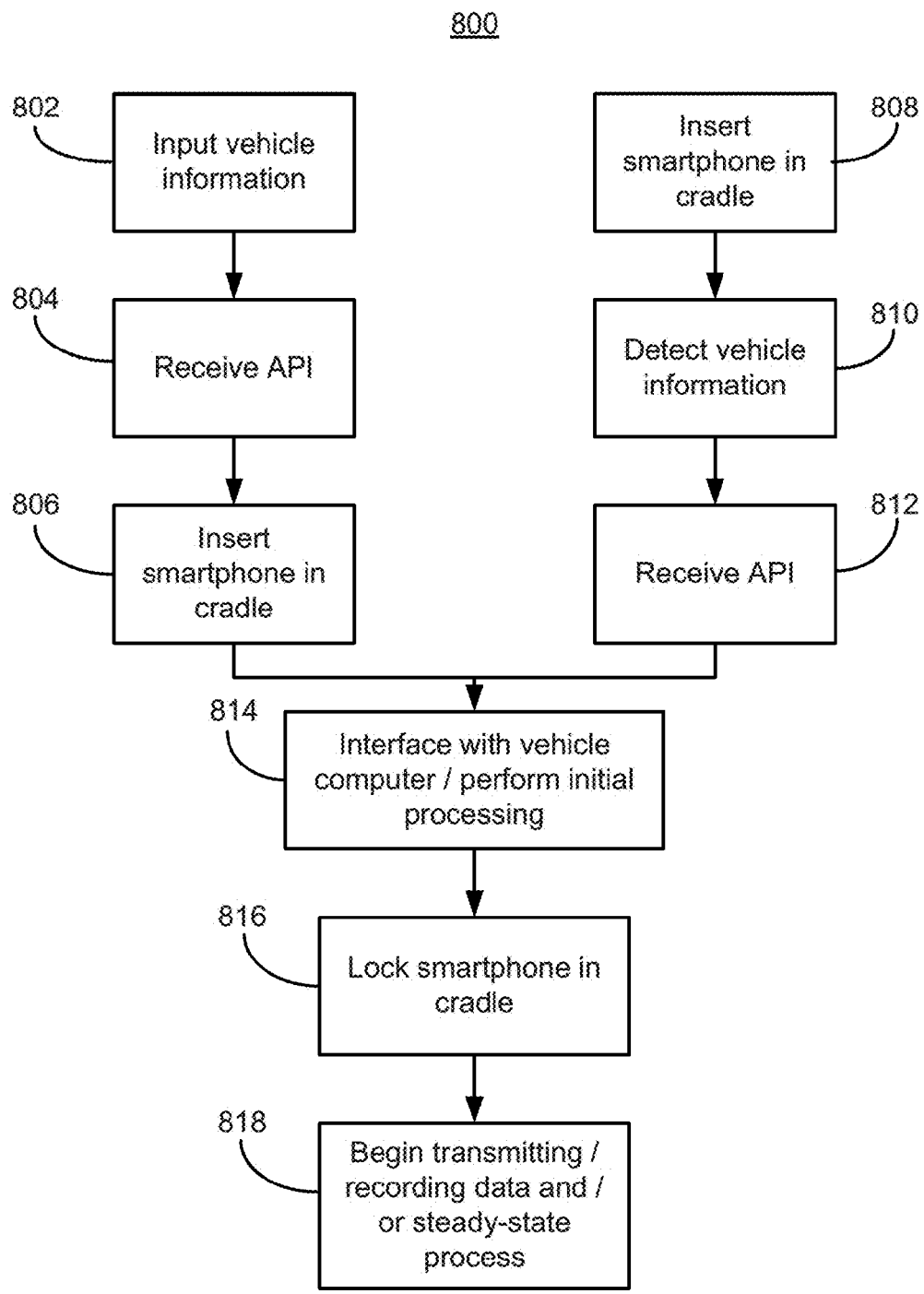
FIG. 8 is a flowchart of an initialization process for providing telematics information from a vehicle, according to an illustrative embodiment of the invention.

FIG. 8 is a flowchart of an initialization process 800 for a smartphone-based system to provide telematics information from a vehicle, according to an illustrative embodiment of the invention. The process 800 may begin at either step 802 or at step 808, depending on whether the system is configured to gather vehicle information manually or automatically.

If the system is configured to gather vehicle information manually, the initialization process 800 begins at step 802. In step 802, the system presents a graphical user interface for a user to input vehicle information, such as a vehicle make or model identification. The graphical user interface is presented via the user interface 210 of a smartphone. After the user has provided vehicle identification information, the system then determines and receives, in step 804, the appropriate vehicle computer communication protocol for interfacing with the onboard vehicle computer. In some embodiments, a smartphone may determine, based on the vehicle identification information, the appropriate protocol. The protocol is then loaded from a local or a remote database. For example, a local storage device, such as memory 208 (FIG. 6) in the smartphone, may contain a database 708b (FIG. 7) with a plurality of vehicle computer communication protocols, each configured to operate with a particular vehicle computer type. When the smartphone has determined the appropriate protocol, it loads the protocol into operating memory from the database 708b (FIG. 7) on the local storage device 208 (FIG. 6). Optionally, protocols may be stored on a remote database. In these embodiments, the smartphone may determine the appropriate protocol from the user-input vehicle identification information and explicitly request the protocol from the remote database via, for example, a wireless request transmitted with one of the wireless protocols described above. Optionally, the smartphone may query a remote server coupled to the remote database with the user-provided vehicle information. The remote server may process the vehicle identification information to determine the appropriate protocol, and then transmit the protocol to the smartphone. In step 806, the smartphone is then inserted into a cradle, such as cradle 100, described above in relation to FIGS. 2-3 and 5. After the smartphone is inserted into the cradle, the process continues with step 814, where the smartphone establishes contact with the vehicle computer through a dataport connector located in the cradle and begins to perform initial processing.

In other embodiments, the initialization process 800 may involve the automatic collection of vehicle identification information. In these embodiments, the initialization process begins with step 808, in which a smartphone is inserted into a cradle, such as cradle 100 described above in relation to FIGS. 2-3 and 5. Upon insertion into the cradle, the smartphone interfaces with the dataport connector located in the cradle and attempts to detect vehicle identification information in step 810. In some embodiments, this is performed by the configuration module 704 (FIG. 7). The smartphone may attempt identification by, for example, querying the onboard vehicle computer through the OBD port. Once the smartphone has detected vehicle identification information, in step 812 it will attempt to retrieve an appropriate vehicle computer communication protocol for interfacing with the vehicle computer. As with step 804, described above, the smartphone may retrieve an appropriate protocol from a local database, request an appropriate protocol from a remote database, or query a remote server coupled to a remote database for the appropriate protocol. Once an appropriate protocol has been retrieved or received, in step 814 the smartphone will establish contact with the vehicle computer and begin initial processing.

Regardless of whether vehicle identification information was obtained manually (step 802) or automatically (step 808), after the smartphone has retrieved the appropriate vehicle computer communication protocol for interfacing with the vehicle computer and is inserted into the holder, the smartphone will interface with the vehicle computer and perform initial processing in step 814. Initial processing may include, without limitation, verifying the identity/identification of the vehicle, verifying that the current protocol is appropriate, transmitting user information and preferences to the vehicle computer, downloading relevant telematics information from the vehicle computer, and/or updating software present on the vehicle computer, and may be performed by configuration module 704 (FIG. 7). In some embodiments, initial processing may include uploading specialized software onto the vehicle computer. The specialized software may assist the smartphone in collecting vehicle telematics information, and/or may assist the smartphone in controlling vehicle functions. In certain embodiments, initial processing includes the identification of a user via biometric information. For example, a user may need to provide biometric identification information in order to start the engine. In some embodiments, the system uses the biometric identification to load a profile that corresponds to the user. This profile may include, for example, maximum allowable speed, restricted geographic areas, and other user preferences and/or restrictions. In some embodiments, the user may need to provide further authentication or authorization information. For example, the user may need to pass a breathalyzer test before the system will allow the vehicle to be operated.

Initial processing may also include determining the particular position and orientation of the accelerometer or other telematics sensor in the smartphone. Since each model of vehicles has a standardized OBD port location and orientation, once the system identifies the vehicle, it determines the particular standardized OBD port location and orientation associated with that vehicle model. The system may determine the OBD location by looking it up in a local or remote database, or by querying a remote server with the vehicle identification information. In addition, for embodiments in which the smartphone holder orientation may be adjusted between a number of predetermined configurations, for example via adjusting a joint or pivot point on arm 112 (FIGS. 2-3), the system determines the current predetermined configuration of the smartphone holder. Based on this information and the vehicle OBD location/orientation, the system determines an accelerometer position and orientation.

After step 814 has been completed, the system locks the smartphone to prevent its removal. The system may lock the smartphone in the cradle by actuating device restraint 110, described above in relation to FIGS. 2-3 and 5. Optionally, the system may check to see if the smartphone is actually located in the cradle by, for example, a magnetic sensor located in the cradle. In some embodiments, after locking the smartphone in the cradle, the system allows the vehicle engine to be started. In these embodiments, the vehicle engine may not be started if there is no smartphone placed in the cradle. Thus, the system can assure that the user cannot use the smartphone while the vehicle engine is running.

After locking the smartphone in the cradle in step 816, the system begins transmitting and/or recording telematics information from the accelerometer within the smartphone and/or vehicle telematics sensors (step 818). In one embodiment, the transmission of telematics information is performed by the smartphone, which transmits the telematics information via a wireless protocol to a network such as the Internet. Optionally, the smartphone may transmit the telematics information directly to a server associated with an insurance company. Optionally, the system may enter a steady-state operational process, further described with relation to FIG. 9.

Figure 9:
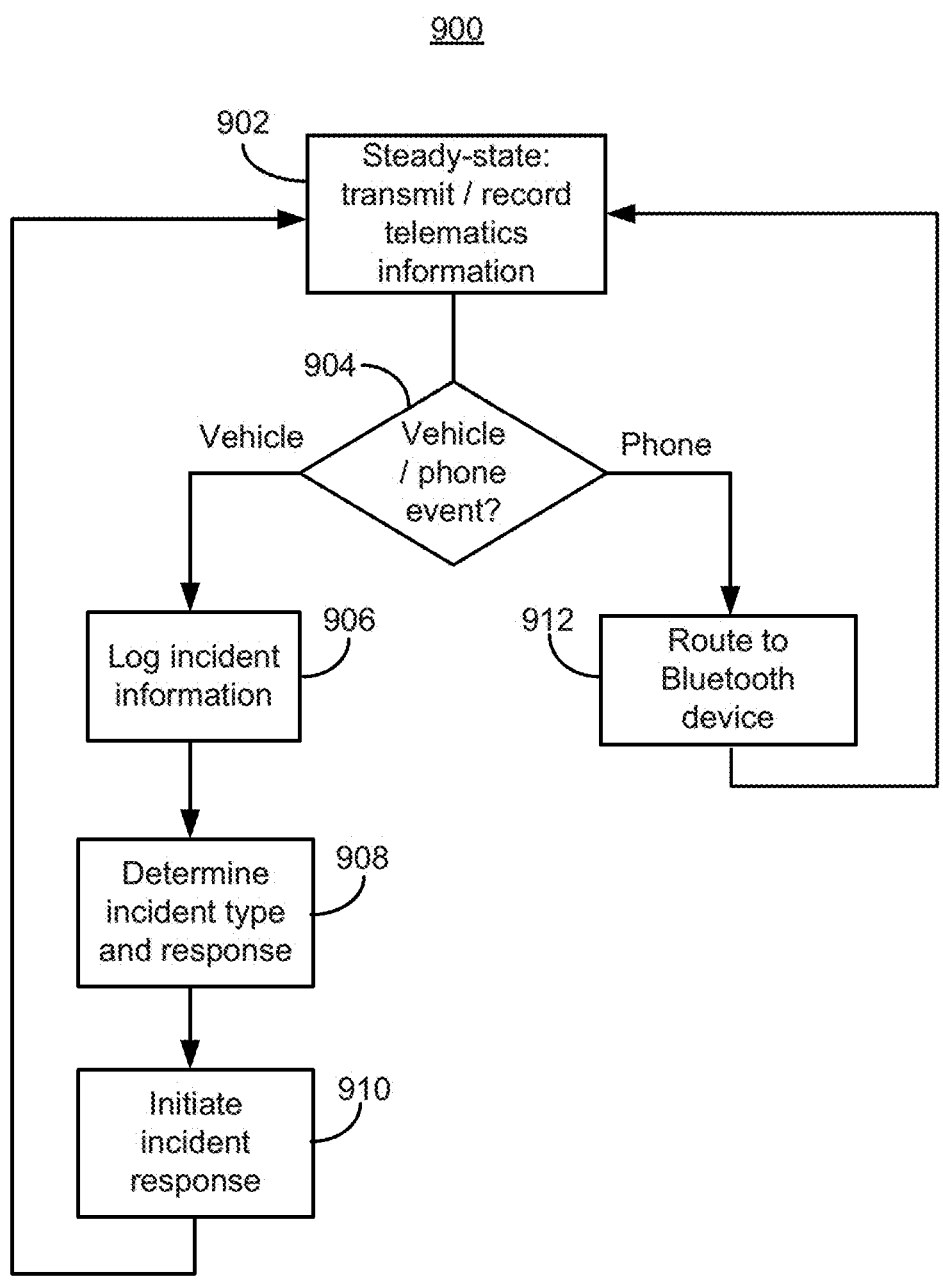
FIG. 9 is a flowchart of a process for providing telematics information from a vehicle, according to an illustrative embodiment of the invention.

FIG. 9 is a flowchart of a steady-state process 900 for a smartphone-based system to provide telematics information from a vehicle, according to an illustrative embodiment of the invention. The steady-state process begins at step 902, similar to step 818 in process 800, where the smartphone-based system transmits and/or records telematics information. The smartphone-based system may also perform other processing tasks in step 902, based on information received from the vehicle, or from the passengers in the vehicle. For example, if the system is configured to receive information about the number of passengers in the vehicle and local high occupancy vehicle (HOV) conditions, the system may, in conjunction with a vehicle GPS navigation system or a GPS navigation system on the smartphone, provide directions to the destination that takes advantage of HOV lanes via, for example, vehicle user interface 514. As another example, the system may, also in conjunction with vehicle/smartphone GPS systems, determine and provide driving directions to maximize vehicle fuel efficiency, based on information such local traffic conditions, terrain or topology, number of passengers, and passenger destinations.

Vehicle or smartphone events may occur while the system is engaged in step 902. These events may include, without limitation, the smartphone receiving a call or message, the vehicle being involved in an accident, or vehicular incidents such as exceeding a particular speed limit or passing beyond a prescribed geographic area. If such an event occurs, the system first determines, in step 904, if it is a vehicle event or a phone event. The system may determine if an event is a vehicle event by monitoring telematics information or changes in telematics information provided by a smartphone telematics sensor and/or a vehicle telematics sensor. For example, if the system detects a sudden deceleration and/or an airbag deployment, it may determine that a vehicle event, such as an accident, has occurred.

If the system determines that a vehicle event has occurred, such as an accident, the system will log information related to the incident (step 906). This information may include geographic location, vehicle speed, time of day, weather conditions, acceleration or deceleration, or any other information from smartphone telematics sensors, vehicle telematics sensors, or any other information source. The system may then determine the type of incident and a suitable response (step 908), based in part on the information logged in step 906. For example, if the incident information includes a sharp deceleration, the system may decide that a vehicle collision has occurred. Suitable responses to incidents may be preprogrammed into the system, or be available from a remote source. For example, the system may be preprogrammed to notify emergency responders and/or one or more contacts if an accident occurs. In this case, if the system determines that an accident has occurred, it will notify the emergency responders and the preprogrammed contacts via, for example, a phone call, a text message, and/or an email. As another example, if the system detects that the vehicle has exceeded a particular preset speed, the system may instruct the vehicle to reduce speed to the preset speed and to not allow the vehicle to exceed the preset speed. Optionally, the system may also inform the user, via vehicle user interfaces 514, for example, that vehicle speed has been limited. In some embodiments, instead of instructing the vehicle to reduce speed, the system may warn the user that the preset speed has been exceeded and instruct the user to reduce speed. These warnings and instructions can be provided via the vehicle user interface 514 as, for example, a displayed or audio message. As yet another example, the system may be preprogrammed to warn the user and notify authorities if the vehicle leaves or is about to leave a permitted geographic operating area or enters a restricted geographic area. In this case, when the system detects that the vehicle is approaching a boundary of the permitted or restricted area, the system may warn the user, via the vehicle user interface 514, that the vehicle is approaching a boundary and instruct the user to change course. Simultaneously, the system may log the incident or notify authorities via, for example, a phone call, a text message, and/or an email. If the vehicle actually crosses the boundary, the system may send a further notification to authorities, and may also render the vehicle inoperable or less operable by limiting its speed. This may occur as soon as the vehicle crosses the boundary, or may occur at a preset time or distance after the boundary has been violated. For example, the system may shut the vehicle down one minute after crossing the boundary, to allow the user sufficient time to reverse course. If the user does reverse course and cross back across the boundary, the system may not shut the vehicle down. The system may impose similar restrictions on the time of day during which a given driver may operate a vehicle, preventing the driver from turning on the vehicle after a configurable time, or limiting a speed after the configurable time.

Suitable responses to incidents may be preprogrammed into the system by the user or by a third party. The responses may vary with the severity of the incident, as reflected by the logged incident data. For example, if an accident with a relatively low deceleration rate occurs, the system may notify the police and one or more preprogrammed contacts. However, if an accident with a relatively large deceleration rate occurs, the system may notify the police department, the fire department, and an ambulance service, as well as the one or more preprogrammed contacts. In some embodiments, the system may be preprogrammed to respond in a particular way for particular incidents or incident types. For example, the system may be preprogrammed to always notify the police department, the fire department, and an ambulance service if an accident occurs. Optionally, the system may be able to dynamically determine an appropriate response for a particular incident, such as basing the response on the severity of the accident, as described above. In addition, the system may forward telematics information related to the accident, such as location of the vehicle, speed of the vehicle at impact, point of impact on the vehicle, whether airbags were deployed, any occurrence of a rollover, detection of a fuel leak, etc., to emergency responders to better prepare them for responding to the incident.

After determining the appropriate response, the system then initiates the response in step 910, then reverts to the steady-state condition in step 902. In some embodiments, the system may continue to initiate the response until it is physically deactivated.

If, at step 904 the system determines that a phone event, such as an incoming call or message, has occurred, it routes the incoming call or message (step 912) to an appropriate receiver, such as a wireless, Bluetooth-enabled hands-free headset. In some embodiments, the headset may be physically hardwired to the smartphone 200 or to the cradle 100. The system may convert text messages or emails into audio data that can be played on the hands-free headset.

In the above embodiments, the process steps may be performed by a smartphone and/or processing circuitry located elsewhere. For example, processing circuitry located in cradle 100 (FIGS. 2-3, 5) and/or the vehicle computer 506 may perform some or all of the process steps described above. In some embodiments, the smartphone may load software for performing some or all of the above process steps onto the vehicle computer 506 during, for example, the initial processing step 614 (FIG. 6).

Figure 10:
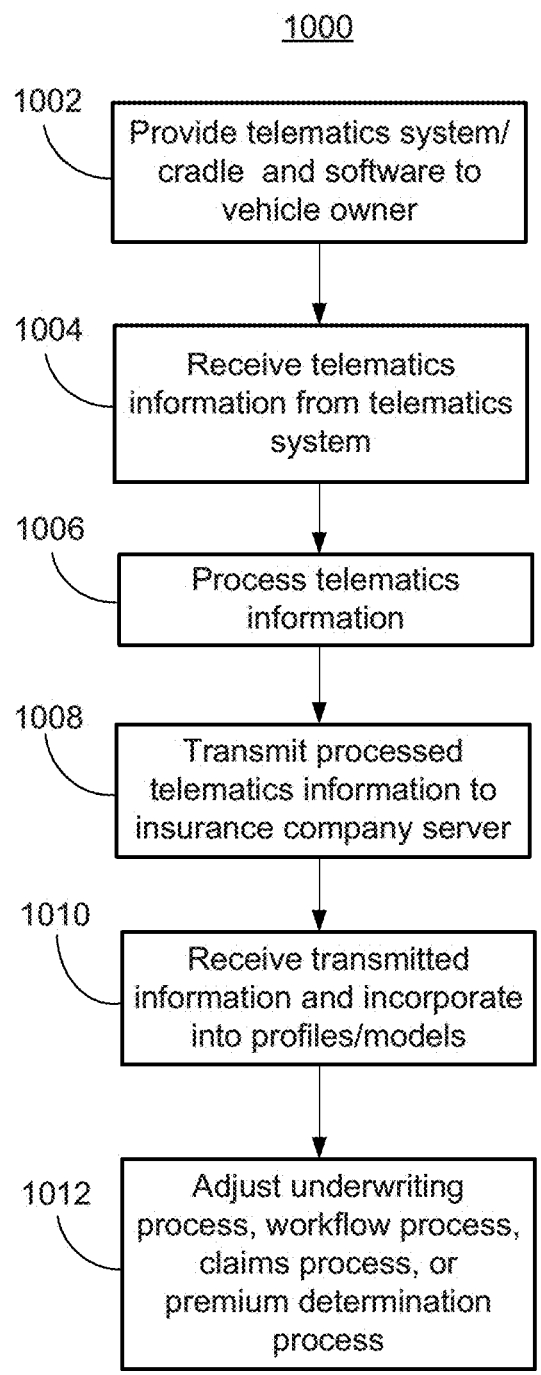
FIG. 10 is a flowchart of a process for adjusting insurance processing, according to an illustrative embodiment of the invention.

FIG. 10 is a flowchart of a process 1000 for adjusting insurance processing, according to an illustrative embodiment of the invention. The insurance processing is performed by a computer or a server associated with the insurance company performing the processing, although in other embodiments the insurance processing may performed by a third party. In step 1002, a telematics system/cradle and accompanying software is provided to the vehicle owner. The telematics system/cradle may be similar to the wireless telematics system 400 (FIG. 4) or to the cradle 100 described in relation to FIGS. 2-3. The vehicle owner may obtain the telematics system/cradle and software from a retail location, an insurance agent, or by mail, either on user request or as a condition for obtaining insurance coverage. The accompanying software may be included, as computer-readable media, in the same physical package as the telematics system/cradle, or the user may be able to download it from a remote server. In some embodiments, multiple telematics systems/cradles may be provided for use with a fleet of vehicles owned by, for example, a business. For example, a delivery business may wish to obtain insurance for all of its delivery vehicles, or may be required to obtain telematics systems for all of its delivery vehicles. Individual telematics systems may be configured to directly transmit information to the insurance company server, or may be configured to transmit information to a computer associated with the vehicle owner or a different party, such as a third party monitoring service or the operator/owner of a vehicle fleet, which then transmits the information to the insurance company.

In step 1004, vehicle telematics information is received from the telematics system(s), which are linked to vehicle telematics sensors or other telematics sensors, such as the smartphone accelerometer 204, described above in relation to FIGS. 5 and 6. In some embodiments, the vehicle telematics information may include other vehicle information received from, for example, the vehicle computer 506. For example, other vehicle information may include the number of passengers in the vehicle, or any scheduled vehicle maintenance tasks. This additional information provides a fuller, more complete dataset about the vehicle, which may be useful for insurance underwriting and workflow adjustment purposes.

The received telematics information is then processed in step 1006 by, for example, smartphone processor 206. Processing received telematics information may include converting the telematics information into different data formats. For example, telematics information received from vehicle telematics sensors may be in a special format that is not compatible with standard data processing software. Processing telematics information may also include combining raw telematics sensor information into vehicle parameters, such as acceleration. For example, the smartphone processor 206 may combine information received from the smartphone accelerometer 204 with information about the position and orientation of the smartphone with respect to the vehicle in order to determine vehicle acceleration information. In addition, the processing may include summarizing telematics data collected over a period of time, filtering the raw data, encrypting, and/or compressing the telematics data. Some or all of the processing may be carried out by software executing on a user's home computer, on a computer of a third party monitoring service, or on a computer of a company operating a fleet of vehicles. In the fleet context, in particular, the processing may also include anonymizing data or aggregating data from multiple drivers into a fleet driving profile.

After the telematics information has been processed in step 1006, the processed information is transmitted to an insurance company computer or server in step 1008. This is accomplished by the smartphone 200, which transmits the information via its transceiver 212 (FIG. 6) over a ground cellular network 22 (FIG. 1), a WIMAX link, or other long range broadband wireless data link. The insurance company server receives the transmitted information via, for example, the Internet, and incorporates the received information into one or more owner-associated profiles and/or models, such as an owner record (step 1010). In some embodiments, the insurance company server may receive raw telematics information representative of a single vehicle or a fleet of vehicles, or aggregate, processed telematics information, which may be anonymized or summarized.

This received information is then used for insurance processing, such as adjusting an underwriting process, a workflow process, a claims resolution process, or a premium determination process (step 1012). For example, the server may use the received information to adjust a quote for a new insurance policy (for example after a trial period during which data is collected) or a quote for renewing an insurance policy. If the received information indicates risky behavior on the part of the vehicle operator(s), then the quoted rates may increase, or the coverage may be declined. Similarly, if the received information indicates safe behavior on the part of the vehicle operator(s), then the quoted rates may decrease. Alternatively, the data could be used to adjust a premium during the term of an existing insurance policy. As another example, if the server receives information that a particular owner has just been involved in a severe vehicle accident, it may notify emergency responders and/or initiate an investigation into the circumstances and extent of the accident in anticipation of an accident claim.

The invention may be embodied in other specific forms without departing from the spirit or essential characteristics thereof. The foregoing embodiments are therefore to be considered in all respects illustrative, rather than limiting of the invention.

What is claimed is:

1. A system for acquiring vehicle telematics data from a telematics-enabled portable communications device in communication with a vehicle computer, comprising:
    a communications interface configured to:
        receive, from a portable personal communications device, telematics data, the portable personal communications device being in communication with a vehicle computer of the vehicle and in at least one of a known orientation or a stable orientation with respect to the vehicle, the telematics data being from at least one of a telematics sensor of the portable personal communications device and the vehicle computer; and
        receive data indicative of an orientation of the personal portable communications device with respect to the vehicle, the data indicative of an orientation of the personal portable communications device with respect to the vehicle comprising data indicative of at least one of a known orientation or a stable orientation with respect to the vehicle; and
    a computer system in communication with the communications interface and configured to:
        receive data indicative of the telematics data and the orientation data from the communications interface; and
        adjust a vehicle insurance process based on the data indicative of the telematics data and the orientation data.

2. The system of claim 1, wherein the data indicative of orientation of the personal portable communications device with respect to the vehicle comprises data indicative of a known orientation of the personal portable communications device with respect to the vehicle.

3. The system of claim 1, wherein the data indicative of orientation of the personal portable communications device with respect to the vehicle comprises data indicative of a stable orientation of the personal portable communications device with respect to the vehicle.

4. The system of claim 3, further comprising a holder configured to maintain the personal portable communications device in the stable orientation with respect to the vehicle.

5. The system of claim 4, wherein the holder comprises an onboard diagnostics (OBD) port connector and a dataport connector communicatively coupled to the OBD port connector.

6. The system of claim 4, wherein the system further comprises at least one of an antenna booster and a global positioning system (GPS) booster.

7. The system of claim 1, wherein a processor of the portable personal communications device executing instructions of an application program stored in a memory of the portable personal communications device converts unprocessed data received from an accelerometer internal to the portable personal communications device to acceleration data based on orientation data stored in a storage device of the portable personal communications device.

8. The system of claim 1, wherein the telematics data comprises telematics data from the telematics sensor of the portable personal communications device and telematics data from the vehicle computer.

9. The system of claim 1, wherein the telematics data is processed after transmission by the portable personal communications device and prior to receipt by the communications interface.

10. The system of claim 1 wherein the computer system is configured to receive telematics data in a second data format, the telematics data being converted to the second data format from a first data format by a processor of the portable personal communications device executing instructions of an application program stored in a memory of the portable personal communications device.

11. The system of claim 1, wherein the vehicle insurance process comprises at least one of an underwriting process, a workflow process, a claims resolution process, and a premium determination process.

12. The system of claim 1, wherein the computer system being configured to adjust the vehicle insurance process comprises the computer system basing one or more of an underwriting decision, a workflow determination, a claims resolution determination and a premium determination, at least in part, on the data indicative of the telematics data.

13. A computer-implemented method for acquiring vehicle telematics data from a telematics enabled portable personal communications device, comprising:
    receiving, by a communications interface, telematics data and orientation data from a portable personal communications device, the telematics data being from at least one of a telematics sensor of the portable personal communications device and the vehicle computer, the portable personal communications device being in at least one of a known orientation or a stable orientation with respect to the vehicle;
    receiving, by a computer system in communication with the communications interface, data indicative of the telematics data and the orientation data from the communications interface, the data indicative of an orientation of the personal portable communications device with respect to the vehicle comprising data indicative of at least one of a known orientation or a stable orientation with respect to the vehicle; and
    adjusting, by the computer system, an insurance process based on the data indicative of the telematics data and the orientation data.

14. The computer-implemented method of claim 13, wherein the receiving by the communications interface comprises receiving data transmitted via a cellular phone network.

15. The computer-implemented method of claim 13, wherein the portable personal communications device is in communication with the vehicle computer, and the telematics data is from the vehicle computer.

16. The computer-implemented method of claim 13, wherein the portable personal communications device is fixed in orientation with respect to a vehicle.

17. The computer-implemented method of claim 13, wherein the receiving the telematics data by the computer system comprises receiving telematics data that is processed after transmission by the portable personal communications device and prior to the receiving by the communications interface.

18. A system for acquiring vehicle telematics data from a telematics enabled portable personal communications device, comprising:
    a computer server including one or more data storage devices storing, and configured to permit download of, processor-executable instructions, which instructions, when executed by a processor of a portable personal communications device, cause the portable personal communications device to:
        transmit telematics data and orientation data, the telematics data being from at least one of a telematics sensor of the portable personal communications device and a vehicle computer, the portable personal communications device being in at least one of a known orientation or a stable orientation with respect to the vehicle; and
    a computer system configured to:
        receive data indicative of the telematics data and the orientation data from the portable personal communications device, the orientation data including data indicative of at least one of a known orientation or a stable orientation of the portable personal communications device with respect to the vehicle; and
        adjust a vehicle insurance process based on the data indicative of the telematics data and the orientation data.

19. The system of claim 18, wherein the processor-executable instructions further comprise instructions, which, when executed by a processor of the portable personal communications device, cause the portable personal communications device to:
    process telematics data received from the vehicle computer via an onboard diagnostics (OBD) port connector.

20. The system of claim 18, wherein the instructions, when executed by a processor of the portable personal communications device, further cause the processor to convert unprocessed data received from an accelerometer internal to the portable personal communications device to acceleration data, based on orientation data stored in a storage device of the portable personal communications device.

* * * * *